Figure 1:
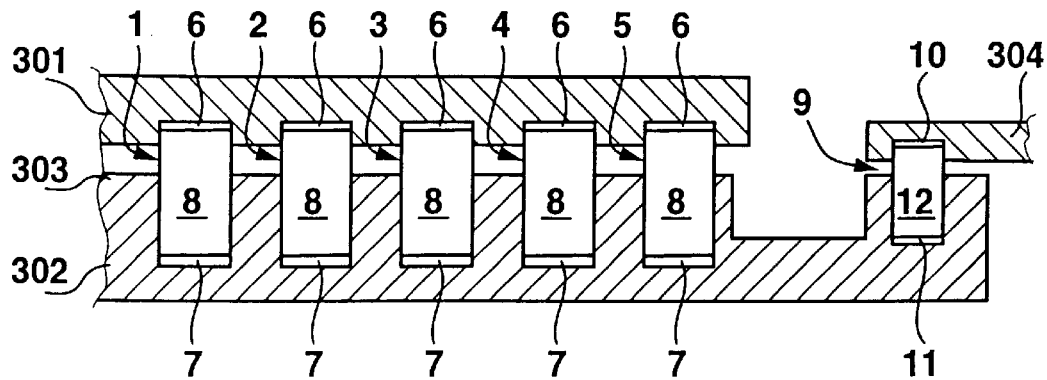

United States Patent

Bauer

[11] Patent Number: 5,990,726
[45] Date of Patent: Nov. 23, 1999

[54] CIRCUIT CONFIGURATION TO DETECT EXCESS TEMPERATURE DUE TO CURRENT FLOW

[75] Inventor: Alfred Bauer, Neu-Isenburg, Germany

[73] Assignee: Braun Aktiengesellschaft, Frankfurt am Main, Germany

[21] Appl. No.: 09/018,612

[22] Filed: Feb. 4, 1998

Related U.S. Application Data

[63] Continuation of application No. PCT/EP96/03902, Sep. 5, 1996.

[30] Foreign Application Priority Data

Sep. 14, 1995 [DE] Germany .......................... 195 34 056

[51] Int. Cl.$^6$ ....................................................... H02H 5/04
[52] U.S. Cl. .............................................. 327/512; 327/565
[58] Field of Search ................................... 327/512, 513, 327/564, 565, 567, 568

[56] References Cited

U.S. PATENT DOCUMENTS

| | | | |
|---|---|---|---|
| 4,764,663 | 8/1988 | Scott | 219/448 |
| 5,258,738 | 11/1993 | Schat | 338/332 |
| 5,563,572 | 10/1996 | Hetzler | 338/254 |

FOREIGN PATENT DOCUMENTS

4014629A1  11/1991  Germany .

OTHER PUBLICATIONS

Bauelemente und Technik für die Oberflächen–Montage, SMD, 1985.

*Primary Examiner*—Tuan T. Lam
*Attorney, Agent, or Firm*—Fish & Richardson P.C.

[57] ABSTRACT

The invention is directed to a circuit configuration for the detection of an excess temperature due to a current flow, in which a first resistor arrangement is thermally coupled to a second resistor arrangement, the resistance value of the second resistor arrangement producing a thermistor action. The current to be evaluated is flown through at least the first resistor arrangement. The first resistor arrangement is comprised of at least one SMD resistor, and the second resistor arrangement of at least one SMD resistor that acts as a thermistor. The second resistor arrangement is electrically connected to at least one contact surface of the printed circuit board which is electrically connected to the at least one SMD resistor of the first resistor arrangement.

11 Claims, 3 Drawing Sheets

CIRCUIT CONFIGURATION TO DETECT EXCESS TEMPERATURE DUE TO CURRENT FLOW

This is a continuation of International Application No. PCT/EP96/03902 filed Sep. 5, 1996, claiming priority from German Patent Application No. 19534056.6 filed Sep. 14, 1995.

This invention relates to a circuit configuration to detect excess temperature due to current flow.

From DE 40 14 629 A1 a motor protective or excess current relay is known in which a temperature-responsive resistor is provided in close proximity to a heating resistor through which motor current is transmitted, said temperature-responsive resistor being arranged together with a switching member in a circuit separate from the motor circuit, such that in the presence of a current exceeding a limit value the switching member interrupts the supply of power to the motor. Preferably, the temperature-responsive resistor is mounted at a location on the one side of a printed circuit board where the heating resistor is arranged on the other side of the printed circuit board, so that the two resistors are thermally coupled to each other.

In a food processor known in the art and sold by the applicant under the designation K1000, an alumina body shaped in the form of a right parallelepiped is provided for the detection of excess temperature, the body having on one of its large sides a low-resistance resistor Rs printed with silver conductive paste. In close proximity thereto, a printed resistor Rn having an NTC characteristic (negative temperature coefficient) is equally provided on the alumina body. These two resistors are incorporated in the electronic circuit for speed adjustment. The motor current flows across the resistor Rs. As a result, the resistor Rs heats and hence also the alumina body. The temperature of the alumina body varies in the process and so does, in consequence, the temperature of the NTC resistor Rn. Because of its NTC characteristic, its resistance value varies. By means of a comparator circuit, the value of the NTC resistor is monitored. When this value drops below a predetermined resistance, the speed controller and hence the supply of power to the electric motor are turned off. This requires good thermal conduction between the resistors and the alumina body. Apart from the threshold value of the NTC resistor at which power is cut off, further essential quantities involved are the dimensions of the alumina body which determine the body's thermal capacity in addition to influencing the body's radiation of heat through the related body surface. By selecting an alumina body of suitable size and geometrical shape and adjusting the NTC resistor to an appropriate threshold value, an excess temperature cut-off function can be realized.

By contrast, it shows in the subject-matter of the present invention that the detection of an excess temperature is possible with substantially simpler means. The components necessary for this function need not be fabricated specifically for the particular application. Rather, components may be used which are fabricated as standardized mass products at low cost. It is also possible for the contact surfaces necessary on the printed circuit board for the transmission of heat to be fabricated on the board directly as the contact surfaces necessary for electrical bonding are being fabricated. Thus the circuit configuration of the present invention can be fabricated to advantage and at very low cost in a single operation as the components are mounted and the bonding is formed on the board. Considering accordingly that no particular handling is necessary to fabricate the circuit configuration of the present invention and mount it on the board, and that thermal coupling can be accomplished using off-the-shelf components, it is therefore in particular in mass production that fabrication is facilitated, resulting in significant cost savings.

The idea underlying the present invention is to ensure that not only good electric contact but also good thermal contact takes place between the surface mounted device SMD resistors and the conductive track at their solder joints with the conductive track of a printed circuit board. Because the conventionally used copper tracks are both good electrical and good thermal conductors, the present invention enables the conductive track to serve as element for thermal coupling of the low-resistance resistor Rs to the NTC resistor Rn initially referred to. As used herein, "thermal coupling" of two components means that the components are constructed and mounted so as to have a heat transmitting relationship with each other.

The circuit configuration of standard components according to the present invention and their mounting is possible within the scope of a conventional fabrication process of a printed circuit board.

The SMD resistors of this configuration are comprised of a body of alumina. This body has a low-resistance paste printed on it. When the SMD resistor is mounted on the printed circuit board, an electrical bond results with the contact surface on the printed circuit board through the electrically conducting connection at the respective end of the SMD resistor. This electrical bond through the coppered terminal of the SMD resistor which is then soldered to the contact surface provides, in addition to the electrical bond, a heat conducting bridge with excellent thermal conductivity. Moreover, a thermally conducting connection exists between the SMD resistor and the contact surface on the printed circuit board by reason of the SMD resistor engaging the contact surface with a portion thereof that does not act as an electrical bond. This portion of the SMD resistor is attached to the printed circuit board by means of an adhesive. The adhesive serves to position the SMD resistor in its proper location for mounting. The thermal conductivity of this transition from the contact surface of the printed circuit board to the SMD component depends substantially on the thermal conductivity of the SMD adhesive employed for fixing the SMD resistor to the printed circuit board. When it is desired to increase the thermal conductivity, it is possible to use an SMD adhesive with additives providing the SMD adhesive with a particularly good thermal conductivity. The alumina material of the SMD resistor enables heat to be transferred from the SMD component to the contact surface or, alternatively, in the reverse direction. In the present invention, thermal coupling between the first and the second resistor arrangement is effected in that the SMD components themselves have a certain thermal capacity by reason of their geometrical dimensions and material, their surface areas enabling a certain radiation of heat. Equally, the contact surfaces on the printed circuit board have a certain thermal capacity, enabling likewise a certain radiation of heat due to their surface areas. Where desired, these quantities may then be referred to for establishing experimentally a threshold value of the resistance for the second resistor arrangement, from which value the presence of an excess temperature is detected. The thermal capacities involved in the circuit configuration of the present invention provide for simulation of the temperature response of the overall arrangement not only during a temperature rise but also during cooling after power is cut off. The overall arrangement then cools only with time. The circuit configuration of the present invention responds similarly.

It is possible to obtain a certain resultant thermal capacity by accumulating the thermal capacities of the individual resistors. Further, by connecting the resistors in parallel, a desired low resistance value to be adjusted for the first resistor arrangement can be realized. The advantageous effect thereby obtained is that off-the-shelf components can be used, eliminating the need for an application-specific fabrication of resistors.

NTC components are available at low cost.

The second resistor arrangement can be in a separate circuit, enabling the evaluation of this resistance value independent of the flowing load current. This evaluation can take place in a separate circuit also when one of the two terminals of the second resistor arrangement is at the same electrical potential as one of the terminals of the first resistor arrangement. In this event, a voltage supply is provided in each of the circuits, and the power of the voltage supply may be substantially less in that particular circuit that merely serves the function of evaluating the resistance value of the second resistor arrangement.

The inclusion of two contact surfaces on the printed circuit board to thermally couple the first and second resistor arrangements results in an optimized heat transfer. At the same time, this arrangement saves space on the printed circuit board.

The circuit configuration desirably ensures that the heat produced in the resistors of the first resistor arrangement is distributed uniformly to the two contact surfaces. This results in an optimized transfer of heat to the second resistor arrangement.

By using equal shares of the second resistor arrangement to contact two conductive tracks, a uniform heat transfer from the two contact surfaces to the second resistor arrangement is ensured.

With use of a particular arrangement of two contact surfaces it is equally possible to obtain a series connection of the two resistor arrangements, with the added effect of an optimized heat transfer taking place due to the inclusion of two contact surfaces on the printed circuit board. At the same time, this arrangement likewise saves space on the printed circuit board.

Embodiments of the present invention are illustrated in the accompanying drawings. In the drawings, FIGS. 1 to 5 are views of various embodiments of the circuit configuration; and FIG. 6 is a view of an embodiment illustrating the use of the circuit configuration.

FIG. 1 shows a first circuit configuration in which SMD resistors 1, 2, 3, 4, 5 of a first resistor arrangement have portions 6 and 7 of their respective contact area, through which an electrical bonding is possible, in engagement with a contact surface 301 and 302, respectively. In the embodiment of FIG. 1, the resistors 1, 2, 3, 4 and 5 forming the first resistor arrangement are connected in parallel. The component body of these resistors is made of alumina material on which the resistor is printed using a conductive paste. This printed resistor is then electrically bonded through the portions 6 and 7 of the resistors 1, 2, 3, 4 and 5. The alumina body is not electrically but thermally conducting. A portion 8 of the contact area through which no electrical bonding between the resistors 1, 2, 3, 4 or 5 and an underlying contact surface is possible, has a major part thereof in engagement with the contact surface 302. This results in a thermal coupling of the SMD resistors 1, 2, 3, 4 and 5 to the contact surface 302.

As becomes further apparent from FIG. 1, a second resistor arrangement is formed by a resistor 9 which is equally an SMD component. Portions 10 and 11 of the contact area of the resistor 9 are bonded to a contact surface 304 and 302, respectively.

A portion 12 of the contact area of the resistor 9 through which no electrical bonding between the resistor 9 and an underlying contact surface is possible, has a major part thereof in engagement with the contact surface 302. This results in a thermal coupling of the SMD resistor 9 to the contact surface 302, precisely as described in connection with resistors 1, 2, 3, 4 and 5.

The current applied to the first resistor arrangement is of a magnitude that may produce an excess temperature. This current produces heat. The heat depends on the amount of current, the length of time for which current flows, the amount of heat emitted per unit of time, and the thermal capacity. The amount of heat produced by the current is proportional to the time integral of the square of the current. The heat, that is, the temperature, is to be checked to see whether it reaches a predetermined limit value. For this purpose, the first resistor arrangement is electrically connected in series with the components carrying this current through the contact surfaces 301, 302. With time, resistors 1, 2, 3, 4 and 5 heat due to current flow in accordance with the thermal capacity of the alumina bodies of the SMD components, the thermal capacity of the contact surfaces, the thermal capacity of the alumina body of the resistor 9, the heat conduction from the resistors 1, 2, 3, 4 and 5 to the resistor 9, as well as the amount of heat emitted through the surfaces. The resultant heating of the resistor 9 causes a variation of the resistance value of the second resistor arrangement which acts in the manner of a thermistor, for example, an NTC resistor. By connecting the contact surfaces 304, 302 to a comparator and evaluator circuit receiving at its input this temperature-caused resistance variation, the occurrence of an excess temperature can be detected, that is, a condition in which a limit value of the temperature is reached or exceeded.

In this circuit configuration the electrically conducting portions 8, 12 of the contact area of the SMD resistors 1, 2, 3, 4, 5 and 9 engage the same contact surface 302. This contact surface 302 serves for thermal coupling in respect of the first and the second resistor arrangement.

It will be understood that the second resistor arrangement may equally comprise several resistors.

Figure 2:
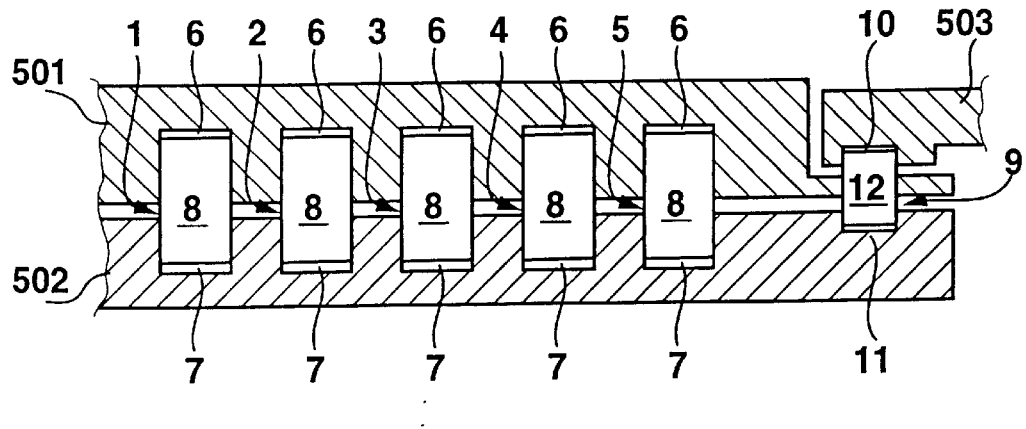

FIG. 2 shows a further circuit configuration in which like reference numerals designate like parts as in FIG. 1 so that these need not be discussed separately.

Unlike the circuit configuration of FIG. 1, in the circuit configuration of FIG. 2 the second resistor arrangement comprised of the resistor 9 is thermally coupled to the first resistor arrangement through the contact surface 501. As becomes apparent from FIG. 2, the second resistor arrangement 9 has the portion 11 of its contact area electrically bonded to the contact surface 502. As appears further from FIG. 2, the region of the contact surface 501 on which the resistor 9 is positioned is configured such that a comparatively large part of the portion 12 of the resistor 9 of the second resistor arrangement, through which no electrical bonding, but only a thermal coupling is possible, is in engagement with the contact surface 501. This results in a particularly good thermal coupling of the resistor 9 to the contact surface 501.

In the circuit configuration of FIG. 2, the contact surfaces 502, 503 are connected to a comparator and evaluator circuit receiving at its input the temperature-caused resistance variation. From this variation the occurrence of an excess temperature can be detected, that is, a condition in which a limit value of the temperature is reached or exceeded.

Figure 3:
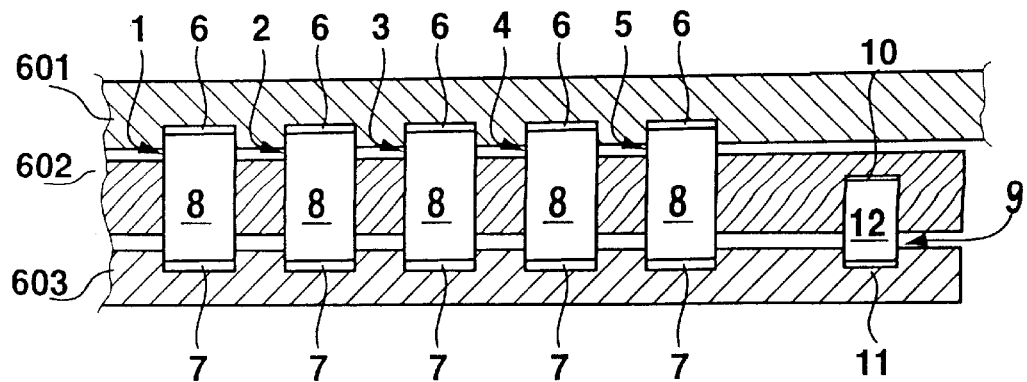

FIG. 3 shows still another circuit configuration in which like reference numerals designate like parts as in FIG. 1 so that these need not be discussed separately.

In the circuit configuration of FIG. 3, the contact surfaces 602, 603 are connected to a comparator and evaluator circuit receiving at its input the temperature-caused resistance variation. From this variation the occurrence of an excess temperature can be detected, that is, a condition in which a limit value of the temperature is reached or exceeded.

The circuit configuration of FIG. 3 is modified with respect to the circuit configuration of FIG. 1 to the effect that those portions 8 of the contact area, through which no electrical bonding between the resistors 1, 2, 3, 4 or 5 and an underlying contact surface is possible, engage the contact surface 602 which corresponds to the contact surface 304 of FIG. 1. This results in a thermal coupling of the SMD resistors 1, 2, 3, 4 and 5 to the resistor 9 of the second resistor arrangement through the contact surface 602.

Figure 4:
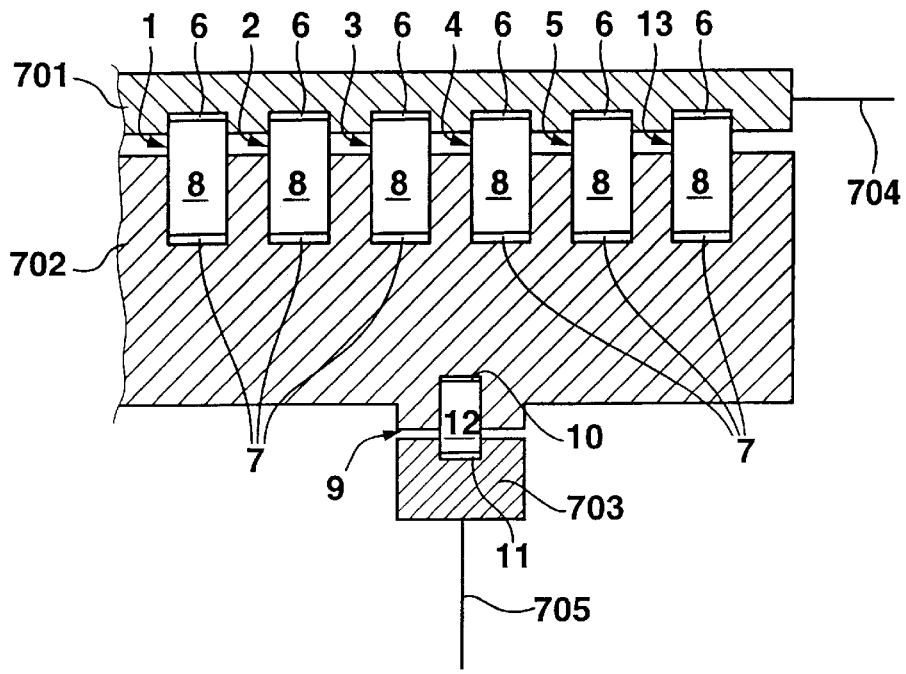

The circuit configuration of FIG. 4 shows that the first resistor arrangement may comprise not only five but any other number of resistors 1, 2, 3, 4, 5, 13, for example six. Equally, the second resistor arrangement may comprise a plurality of resistors which is, however, not shown in the drawing. The first resistor arrangement and the second resistor arrangement are connected in series through the contact surfaces 701, 702, 703, in addition to being electrically bonded through the leads 704 and 705 shown. From this results a simple possibility of connecting the resistors. It is possible in this arrangement to bond the lead 705 and the contact surface 702 directly to the evaluator circuit for improved evaluation of the signal.

Figure 5:
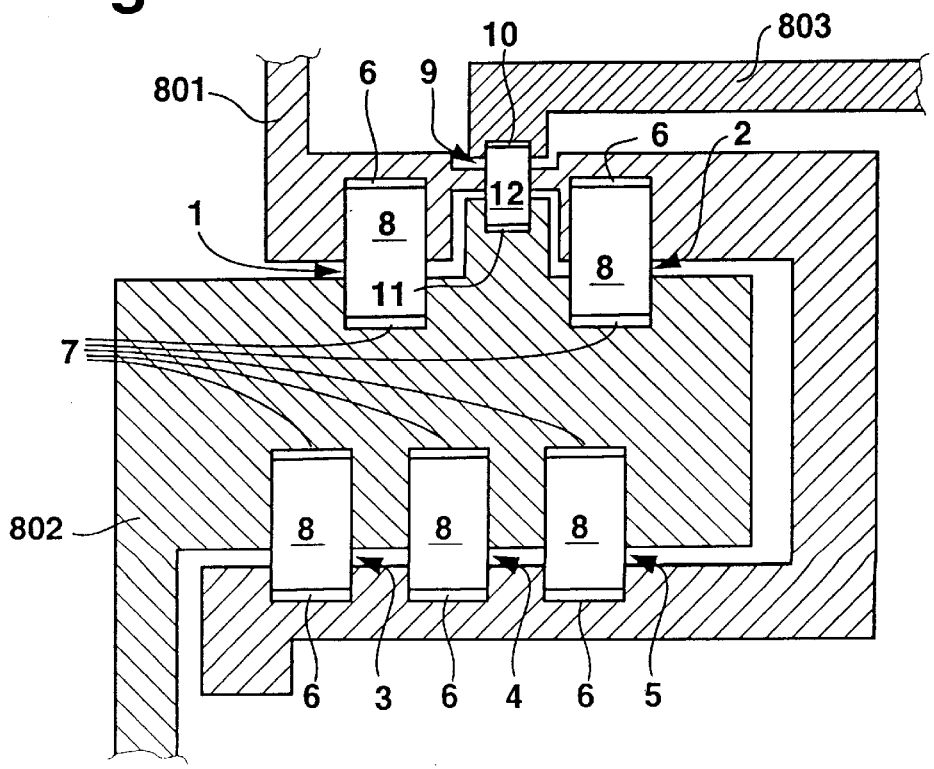
Figure 6:
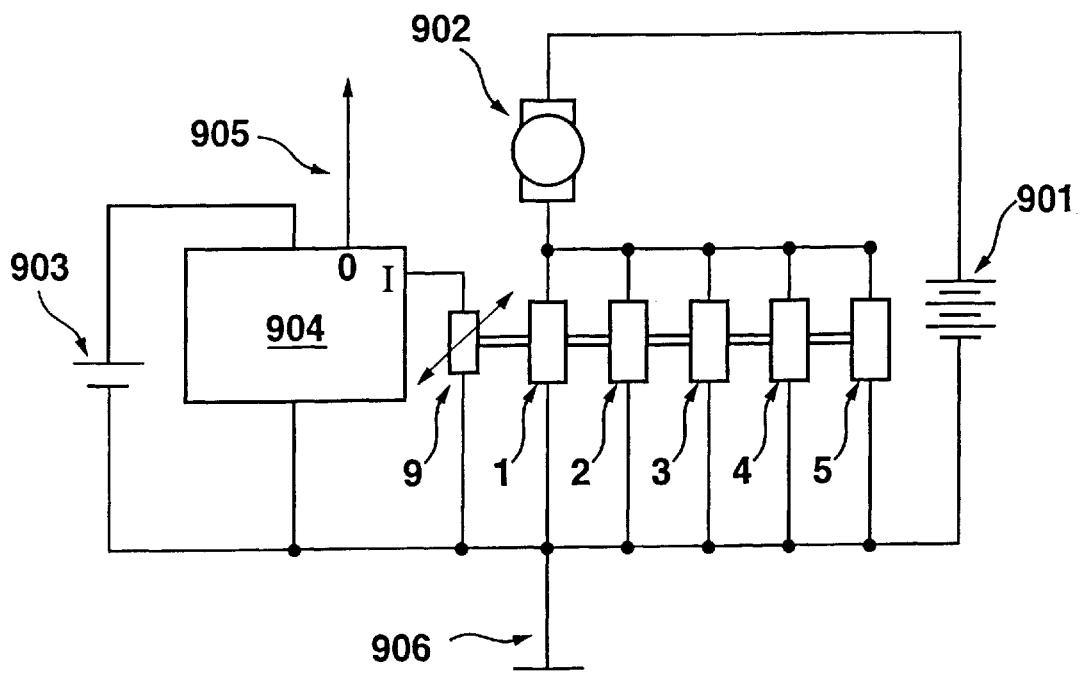

FIG. 5 shows a further particularly preferred embodiment of the circuit configuration. The SMD resistors 1, 2, 3, 4, 5 of a first resistor arrangement have those portions 6 and 7 of their respective contact area, through which electrical bonding is possible, in engagement with a contact surface 801 and 802, respectively. In the embodiment of FIG. 5, the resistors 1, 2, 3, 4 and 5 forming the first resistor arrangement are connected in parallel. Portion 12 of the contact area of the resistor 9 of the second resistor arrangement, through which only a thermal, but not an electric contact, can take place, engages the contact surface 802 together with the electrically bonding portion 11, in addition to engaging the contact surface 801 without electric contact taking place. Both contact surfaces 801 and 802 are thereby utilized for thermal coupling to advantage. A portion 8 through which no electrical bonding between the resistors 1, 2, 3, 4 or 5 and an underlying contact surface is possible engages one of the contact surfaces 801 and 802. This results in a thermal coupling of the SMD resistors 1, 2, 3, 4 and 5 to both the contact surface 801 and the contact surface 802.

In the embodiment of FIG. 5 it proves to be an advantage if the resistors 1, 2, 3, 4 and 5 of the first resistor arrangement are divided into two groups, one comprising the resistors 1 and 2 and the other the resistors 3, 4 and 5. As appears from FIG. 5, the resistors 1 and 2 of the first group have a major part of the portion 8 of their contact area, through which no electrical bonding is possible, in engagement with the contact surface 801. The resistors 3, 4 and 5 of the second group have a major part of the portion 8 of their contact area, through which no electrical bonding is possible, in engagement with the contact surface 802. As a result, the resistors 1 and 2 of the first group deliver the heat primarily to the contact surface 801, whilst the resistors 3, 4 and 5 of the second group emit the heat predominantly to the contact surface 802. Thermal capacity and thermal conductivity of the contact surfaces 801 and 802 are thereby utilized particularly well.

To enable a particularly good heat transfer to the resistor 9, this resistor rests with about equal shares of its portion 12, through which no electrical bonding is possible, on the contact surfaces 801 and 802.

The invention described is especially suitable for monitoring the temperature of an electric motor, in particular a drive motor of a food processor for domestic use. In view of the large quantities involved, major savings can be realized by the use of comparatively low-cost standard components.

FIG. 6 shows a circuitry incorporating the circuit configuration of the present invention. The first resistor arrangement includes the SMD resistors 1, 2, 3, 4 and 5. These SMD resistors are connected in series with an electric motor 902, so that the same current flows through the SMD resistors and the electric motor. Each of the SMD resistors 1, 2, 3, 4 and 5 has a resistance of 1 ohm, resulting in an equivalent resistance of 0.2 ohms for the first resistor arrangement. This circuit comprised of the first resistor arrangement and the electric motor 902 is energized from a voltage supply 901. Thermally coupled to this first resistor arrangement is a second resistor arrangement comprised of the SMD resistor 9. This resistor 9 has an NTC characteristic with a resistance of 10 kilohms, approximately, at room temperature. This resistance value drops as the heat rises. Connected to this second resistor arrangement is an evaluator unit 904. This circuit further includes a second voltage supply 903 supplying a voltage of 15 V, for example. In the presence of a high current in the first circuit, the first resistor arrangement heats, and so does the second resistor arrangement because of the thermal coupling. The variation of the resistance value of the second resistor arrangement is then monitored to see whether it drops below a predetermined threshold value. If this condition is detected by the evaluator unit 904, it delivers an output signal 905. This output signal 905 may be used for cutting off the motor current in the first circuit by means of a relay (not shown), for example. After the motor current is cut off, an only gradual cooling of the first resistor arrangement takes place because of the thermal capacity of the alumina components of the SMD resistors 1, 2, 3, 4, 5 and 9. However, this precisely simulates the real relationships in the embodiment described, because the motor, too, cools only slowly.

As shown, the first and the second resistor arrangement are electrically interconnected at a bonding site. Through this electrical bond a particularly good thermal conduction is accomplished between the first and the second resistor arrangement. In addition, it saves space on the printed circuit board.

It is also possible to position the first resistor arrangement such that a current flows through it which is merely representative of the motor current.

If the motor is controlled by pulse duration modulation, for example, a free-wheeling diode, not shown, is connected in parallel with the motor. At the instant when the motor is disconnected from the voltage supply by the pulse duration modulation, no current flows from the voltage supply to the motor. Because of Lenz's law, however, a current then flows in the circuit comprised of the motor and the free-wheeling diode.

It is then possible for the first resistor arrangement to be positioned such that it is not in the circuit comprising the free-wheeling diode and the motor. The current flowing through the first resistor arrangement is then the current that flows from the voltage supply to the motor when the motor is connected to the voltage supply by pulse duration modulation.

However, this current is related to the current flowing through the motor so that the current flowing through the first resistor arrangement is likewise a current that is representative of the motor current. The first resistor arrangement may then be used simultaneously for controlling the motor.

The dimensions indicated in the foregoing have proven to be of advantage in combination with a 500 W direct-current motor of a food processor for domestic use. The size of the contact surfaces on the printed circuit board relative to the SMD resistors corresponds essentially to the relative dimensions of FIG. 5.

I claim:

1. A circuit configuration for the detection of an excess temperature due to current flow comprising:

a first resistor arrangement that is thermally coupled to a second resistor arrangement, wherein the resistance value of said second resistor arrangement has a thermistor action, the current to be detected is transmitted through at least said first resistor arrangement, wherein said first resistor arrangement is comprised of at least one surface mounted device resistor that is thermally coupled to a conductive track, and wherein said second resistor arrangement is comprised of at least one surface mounted device resistor thermally coupled to said conductive track.

2. The circuit configuration as claimed in claim 1, wherein said first resistor arrangement is comprised of at least five surface mounted device resistors electrically connected in parallel.

3. The circuit configuration as claimed in claim 1 wherein said second resistor arrangement has an negative temperature coefficient characteristic.

4. The circuit configuration as claimed in claim 1
wherein said second resistor arrangement is in a separate circuit through which the current to be evaluated is not transmitted.

5. The circuit configuration as claimed in claim 1, 2, 3 or 4,
wherein said first resistor arrangement is electrically connected to the conductive track and that said second resistor arrangement is electrically connected to the conductive track.

6. The circuit configuration as claimed in claim 1, 2, 3 or 4,
wherein said conductive track is a first conductive track, said first resistor arrangement is electrically connected to said first conductive track through a first termination, providing at the same time for thermal coupling of said first conductive track to said first resistor arrangement, and wherein said first resistor arrangement is electrically connected through a second termination to a second conductive track, providing at the same time for thermal coupling of said second conductive track to said first resistor arrangement, and wherein said second resistor arrangement is both thermally and electrically connected to said second conductive track, and wherein said second resistor arrangement has its other termination electrically connected to a third conductive track.

7. The circuit configuration as claimed in claim 2,
wherein said conductive track is a first conductive track, part of the surface mounted device resistors of said first resistor arrangement have a major part of a portion, through which no electrical bonding is possible, in engagement with said first conductive track, and that the remaining surface mounted device resistors of said first resistor arrangement have a major part of the portion, through which no electrical bonding is possible, in engagement with a second conductive track.

8. The circuit configuration as claimed in claim 7, wherein a portion of the surface mounted device resistor of said second resistor arrangement, through which no electrical bonding is possible, rests with about equal shares on said first and said second conductive track.

9. The circuit configuration as claimed in claim 1, 2, 3 or 4,
wherein said conductive track is a first conductive track, said second resistor arrangement is electrically connected to said first conductive track through a first termination, providing at the same time for thermal coupling of said first conductive track to said second resistor arrangement, and wherein said second resistor arrangement is electrically connected through a second termination to a second conductive track, providing at the same time for thermal coupling of said second conductive track to said second resistor arrangement, and wherein said first resistor arrangement is both thermally and electrically connected to said second conductive track, and wherein said first resistor arrangement is thermally coupled to said first conductive track and wherein said first resistor arrangement has its other termination electrically connected to a third conductive track.

10. An electric motor drive circuit configuration comprising an electric motor connected to the first resistor arrangement of claim 1.

11. A food processor comprising an electric motor connected to the first resistor arrangement of claim 1.

* * * * *